United States Patent [19]
Haseltine et al.

[11] Patent Number: 5,753,190
[45] Date of Patent: May 19, 1998

[54] VACUUM SYSTEM FOR CONTROLLING PRESSURE IN A POLYESTER PROCESS

[75] Inventors: Douglas M. Haseltine; Thomas L. Yount; Jimmy L. Ryans, all of Kingsport, Tenn.

[73] Assignee: Eastman Chemical Company, Kingsport, Tenn.

[21] Appl. No.: 505,428

[22] Filed: Jul. 21, 1995

Related U.S. Application Data

[62] Division of Ser. No. 401,375, Mar. 9, 1995, Pat. No. 5,466,765.

[51] Int. Cl.$^6$ ........................................... C08F 2/00
[52] U.S. Cl. ...................... 422/131; 422/134; 203/73; 203/77
[58] Field of Search ........................ 422/131, 134; 526/65, 71; 528/272, 308.3, 308.5; 203/73, 77, 87

[56] References Cited

U.S. PATENT DOCUMENTS

| | | |
|---|---|---|
| 3,157,619 | 11/1964 | Bell et al. . |
| 3,250,747 | 5/1966 | Mitchell et al. . |
| 3,359,074 | 12/1967 | Dobo . |
| 3,468,849 | 9/1969 | Rothert . |
| 4,758,650 | 7/1988 | Van Endert .................. 528/308.3 |
| 5,466,776 | 11/1995 | Krautstrunk et al. .................. 526/68 |

FOREIGN PATENT DOCUMENTS

| | | |
|---|---|---|
| 0685502 A2 | 12/1995 | European Pat. Off. . |
| 158786 C | 2/1983 | German Dem. Rep. . |
| 2809113 A1 | 10/1979 | Germany . |
| 56-59842 A | 5/1981 | Japan . |
| 7188404 | 7/1995 | Japan . |

OTHER PUBLICATIONS

Patent Abstracts of Japan, vol. 10, No. 321, C-382, abstract of JP.A.61-130336 (Toyobo Co Ltd), 18 Jun. 1986.
Patent Abstracts of Japan, vol. 10, No. 4, C-322, abstract of JP.A.60-163918 (Toyo Boseki K.K.), 26 Aug. 1985.
Patent Abstracts of Japan, vol. 10, No. 194, C-358, abstract of JP.A.61-37819 (Toray Ind Inc), 22 Feb. 1986.
Ryans, J. L. and D. L. Roper, *Process Vacuum System Design & Operation*, McGraw-Hill Book Company, New York, 1986, pp. 230-237.

Primary Examiner—Christopher Kim
Attorney, Agent, or Firm—Karen A. Harding; Harry J. Gwinnell

[57] ABSTRACT

The present invention discloses a polymerization system having at least two reaction chambers wherein vacuum is used to remove vapors therefrom comprising a single vacuum system for supplying vacuum in increasing amounts to successive reaction chambers. Also disclosed is a polymerization process having at least first and second reaction chambers in which the pressure is decreased successively from said first chamber to a final chamber.

8 Claims, 2 Drawing Sheets

VACUUM SYSTEM FOR CONTROLLING PRESSURE IN A POLYESTER PROCESS

This is a divisional application of application Ser. No. 08/401,375, filed Mar. 9, 1995, now U.S. Pat. No. 5,466,765.

FIELD OF THE INVENTION

The present invention relates to an apparatus for removal of by-products and excess glycol from a commercial scale polymerization reaction.

BACKGROUND OF THE INVENTION

In a conventional condensation polymerization system the reactors are separate vessels; and each of the vessels has its own vacuum system with a direct-contact spray condenser. Frequently these systems experience problems as by-products of the reaction and excess reactants are removed from the melt. Some monomer and low-molecular-weight polymer, which have a high propensity for solidification, foul or plug condensers and vacuum equipment. This fouling is one of the most frequent reasons polymer plants lose annual production capacity.

Fundamentally, components have solubility limits of concentration in the fluids that are present in vapor-handling equipment. Fouling can occur whenever the concentration of a component exceeds its solubility limit. When these limits are exceeded in the laboratory or full-scale production plants, one observes cloudy condensates; and fouling of equipment is likely. Over time, this fouling causes operational problems that must be dealt with. Often, production plants must interrupt normal operations to handle the solid build-up. They lose valuable production capacity during that time.

To alleviate the fouling in vapor handling equipment, several approaches have been developed. First, equipment is jacketed to raise the surface temperatures. In theory, higher surface temperatures allow higher concentrations to be present before solubility limits are exceeded. This is only marginally effective, however, because the solvent tends to evaporate. Where the mixtures are somewhat stagnant, this evaporation enriches the mixture in solids-forming ingredients, concentrations rise above solubility limits, and solids adhere to the surfaces.

Design and operation of the condenser to handle relatively high levels of solids-forming material is another approach. Scraped-surface condensers are common now in many polymer plants. These devices have moving mechanical parts that remove solids as they build up on surfaces.

A solution to plugging in ejectors is described in U.S. Pat. No. 3,468,849. Instead of using steam as the motive fluid for an ejector, they use a solvent that tends to dissolve the solids-forming materials. For polyethylene terephthalate (PET), the motive fluid is ethylene glycol vapor. Since ethylene glycol is a primary reactant for the PET reaction and a good solvent, it is an ideal fluid for the ejectors.

The apparatus disclosed in U.S. Pat. No. 3,468,849 has several independent reaction vessels or chambers. Since a single ejector cannot practically be designed to achieve the very low pressures required by the process, each reaction chamber has its own multistage vacuum system to compress the inerts from the given reaction chamber.

However, this configuration has been found to be undesirable in several respects. The capital cost of an additional condenser and an additional vacuum system and the auxiliary equipment required for operation of the condenser and vacuum system is quite large. In addition to raising the capital cost per pound of polymer produced, the extra items diminish the overall reliability of the polymer plant. Moreover, each vacuum system has its own motive fluid requirements. Thus, additional vacuum systems greatly increase the amount of motive fluid which must be treated to remove environmental hazards. Accordingly, there remains a need in the polymer production art for a simplified system to condense vapor discharged from the reaction chambers and to generate the required vacuum levels for the respective reaction chambers.

DESCRIPTION OF THE INVENTION

The present invention discloses a polymerization system having at least two reaction chambers wherein vacuum is used to remove vapors therefrom the improvement which comprises a single vacuum system for supplying vacuum in increasing amounts to successive reaction chambers said single vacuum system comprising:

a condenser connected to each reaction chamber except the final reaction chamber, said condenser connected by a condenser conduit;

a reaction chamber ejector connected to each of said condensers and said final reaction chamber by an ejector conduit; wherein said ejectors use condensed vapor from the reaction chamber as motive fluid;

ejector discharge conduits connecting each of said ejectors to the condenser of the preceding stage such that each ejector discharges into the condenser connected to the preceding reaction chamber;

a finishing ejector connected to the first stage condenser by an ejector conduit;

a vacuum pump connected to said finishing ejector via a pump line; and motive fluid feed lines which are connected to each of said ejectors and which feed motive fluid into said ejectors.

Also disclosed is a polymerization process having at least first and second reaction stages in which the pressure is decreased successively from said first stage to a final stage, said process comprising the steps of:

maintaining a vacuum in said final stage by removing final stage vapors therefrom via a final stage ejector connected thereto by a vacuum line;

directing discharge from said final chamber ejector into a first chamber precondenser to produce first chamber non-condensed materials and condensed first chamber ejector motive fluid;

directing said first chamber ejector non-condensed materials from said first chamber precondenser to a second ejector connected thereto by a vacuum line;

directing discharge from said second ejector into a second condenser to produce second condenser non-condensed materials and condensed second ejector motive fluid; wherein said second condenser is connected to a vacuum pump.

Preferably, the vacuum system of the present invention comprises at least three serially attached vacuum means which are selectively attached to the appropriate reaction chambers.

Figure 2:
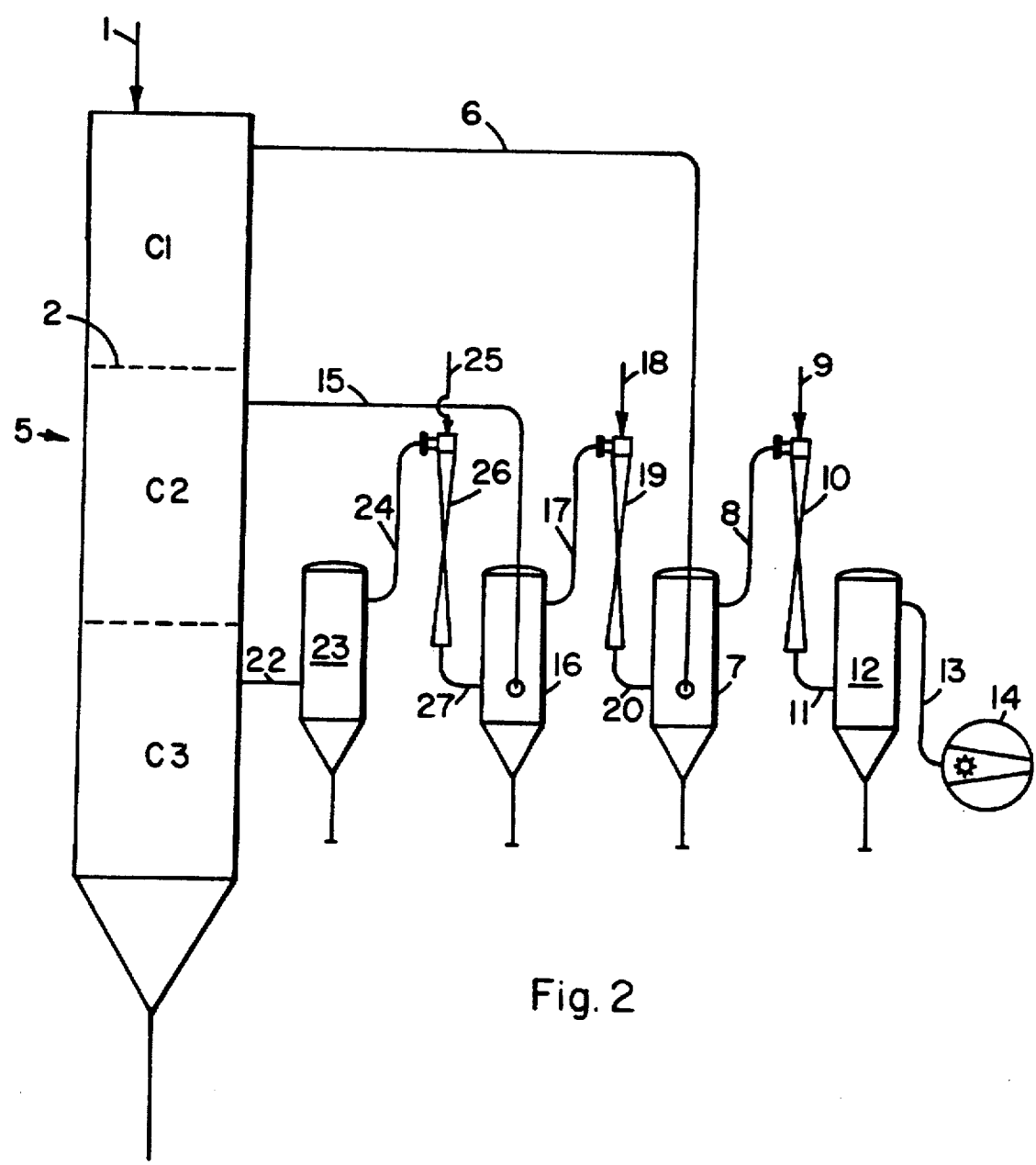
FIG. 2 shows a schematic of the apparatus of the present invention.

The apparatus is further described with reference to FIG. 2.

The raw materials necessary for the desired polymerization are introduced into the first chamber (C1) of the reaction vessel (5) via line 1. Suitable raw materials for introduction into (C1) include the reaction products of dicarboxylic acids such as, but not limited to terephthalic acid, isophthalic acid, cyclohexane dicarboxylic acid, naphthalenedicarboxylic acid and mixtures thereof, dicarboxylic esters such as, but not limited to dimethylterephthalate, dimethylisophthalate, dimethylnaphthalene dicarboxylate and mixtures thereof, and glycols such as, but not limited to ethylene glycol, diethylene glycol and cyclohexane dimethanol and mixtures thereof. For simplicity the specification will normally refer to terephthalic acid and ethylene glycol as the reactants.

Reaction vessel (5) may be a plurality of connected reaction vessels or a single reaction vessel having the appropriate number of reaction chambers. Apparatus having a single vessel with several reaction chambers may be preferred to reduce the amount of floor space required. Single vessel reactors may have a horizontal, sloped or vertical orientation. A vertical orientation may be preferred to further reduce the space requirements of the reactor, if single vessels containing a plurality of chambers are used. Suitable vessels are generally known in the art and include those described in U.S. Pat. Nos. 3,359,074, 3,250,747 and 3,157,619.

Gravity facilitates flow between compartments and flow on trays (mounted within each compartment to provide residence time and surface renewal). Liquid flows between compartments through seal arrangements that prevent vapor from passing. Seal legs allow each compartment to operate at a distinct vacuum level. The number of thick, jacketed, pressure-vessel heads is reduced to two in the single vessel design. The partitions serve as both the bottom head for one reaction step and the top head for the subsequent one. There is no need to jacket the partitions.

Excess glycol from the reaction in the first chamber (C1) is removed via a suction line (6) to condenser 7. Generally suitable condensers are large cylindrical vessels having a length to diameter ratio of between about 5:1 to about 10:1. Coolant is typically distributed through the condenser via hollow cone or full cone spray nozzles which are mounted in the condenser vessel. Suitable condensers are readily available from a number of suppliers, including Graham Manufacturing and Croll-Reynolds.

Non-condensed materials (e.g., air and vapors of saturation) from first chamber condenser (7) are discharged via line (8) to first chamber vacuum ejector (10). The content of the non-condensed materials may change through each stage of the vacuum system. As the pressure increases across the ejectors, some of the non-condensed materials from the previous stage may condense and be discharged with the condensed motive fluid. Motive fluid is supplied to ejector (10) to maintain the appropriate pressure therein via line (9). The motive fluid for each ejector may be virgin, recycled from the condensed materials from the condenser and/or process vapors from elsewhere in production process. The motive fluid and non-condensed materials from line (8) exit the ejector via line (11) and are drawn through condenser (12). Suction to drive the ejectors and condensers is provided by pump (14), which is connected to condenser (12) via line (13). Suitable pumps include liquid rings, ejectors, ejector-liquid ring systems, rotary lobe blower-liquid ring systems and other vacuum pumps or pumping systems known in the art.

Once the raw materials have formed the desired oligomers the solution passes through the first seal (2) into the second reaction chamber (C2). If the reaction is conducted in multichambered single vessel reactor the mixture passes through a seal or valve. Any configuration capable of maintaining a liquid seal between the reaction chambers, which operate at different pressures, may be used. Examples include conventional pipe traps where the discharge is elevated sufficiently above the inlet to keep the trap full of liquid (a height equivalent to the maximum static pressure difference between the two chambers, plus the fictional pressure loss due to flow in the pipe) and other flow channels that are not circular, but also accomplish a full liquid seal to prevent vapor flow between chambers. If the reaction is conducted in separate vessels this can be done via an interconnecting line containing a pressure let down valve.

In the second reaction chamber (C2) the monomers are polymerized in the presence of a suitable polycondensation catalyst and excess glycol is removed via line (15) to condenser (16). The non-condensed materials from condenser (16) are discharged to second chamber ejector (19) via line (17). Motive fluid is fed to ejector (19) via line (18) to maintain the appropriate ejector pressure. The mixture of process vapors, motive fluid and air (present in the system because of air leaks into the reaction chambers) is discharged from ejector (19) and fed to intercondenser (7) via line (20). The term fluid as used herein includes any combination of process vapors, motive fluid and air.

The reaction mixture from chamber (C2) is transported into chamber (C3) for the next phase of reaction. The pressure in chamber (C3) is maintained by withdrawing fluid via line (22). The fluid withdrawn may be discharged directly to third chamber ejector (26), or may be discharged through precondenser (23) and then non-condensed materials may be discharged to third chamber ejector (26) via line (24). Motive fluid is be supplied via line (25) as necessary to maintain the appropriate pressure in ejector (26). Fluid is discharged from ejector (26) to condenser (16) via line (27).

Condensers perform two functions in the process of the present invention. Similar to conventional systems the condensers condense fluid from the previous vacuum stage. However, the condensers of the present invention also precondense the fluids drawn directly from the reaction vessels. The dual function of the condensers is integral to the single train configuration of the present invention. An integrated system cannot be designed without dual function condensers. Moreover, it is clear from comparison of FIGS. 1 and 2 that the present invention reduces the number of condenser vessels, and pumps as well as valves, piping and instruments by more than half. Each additional piece of equipment increases the risk of process shutdown and lost annual production.

For every polymerization process, each reaction chamber has a set pressure range which must be maintained to continue the reaction and prevent the condensed fluids from discharging back into the reaction chamber. If the pressure across an ejector exceeds a predesigned point (break pressure), the direction of flow is reversed and condensed liquids are discharged back into the reaction chamber. Just one incident can ruin thousands of pounds of polymer, which must then be incinerated. Moreover, the entire reaction must be shutdown and all the vessels cleaned out, losing valuable run time. Accordingly, reaction conditions must be chosen carefully to minimize the amount of solids-forming material leaving the reactor in the vapor stream, and prevent exceeding the break pressure of the ejectors.

At least one additional vacuum level over conventional practice is preferred. This addition was not practical in prior art systems because of the high capital cost for reactors and associated vacuum systems.

The systems of the present invention have at least two reaction chambers, preferably the systems have at least three reaction chambers and most preferably four reaction chambers.

The preferred operating pressures for the sub-atmospheric part of the polyethylene terephthalate process generally fall within the following ranges which are each preceded by about:

|  | Pressure |
| --- | --- |
| 1st Vacuum Level/Reactor | 30–750 Torr |
| 2nd Vacuum Level/Reactor | 8–150 Torr |
| 3rd Vacuum Level/Reactor | 1–18 Torr |
| 4th Vacuum Level/Reactor | 0.2–2.25 Torr |

If three reaction chambers are used the pressure levels used are those listed for the second through fourth levels. If only two levels are used the pressure levels used are those listed for the third and fourth levels.

With reasonable residence times and temperatures, these pressure steps yield condensates that are predominantly free of precipitated solids. Completing the polycondensation reaction with fewer pressure letdowns results in cloudy condensates.

To prevent back pressure on the ejectors (which may cause unwanted discharging back into the reaction vessels) the intercondensers used in the present invention are larger and capable of condensing more fluid than normal and the ejectors are designed for higher compression ratios than normal. The break pressures of the ejectors must be sufficient to provide adequate control. The recommended control ranges for the target vacuum levels are listed below:

|  | Target | Range |
| --- | --- | --- |
| 1st Vacuum Level/Reactor | 98 | 80–200 Torr |
| 2nd Vacuum Level/Reactor | 15 | 12–30 |
| 3rd Vacuum Level/Reactor | 4 | 3–8 |
| 4th Vacuum Level/Reactor | 0.75 | 0.5–2.25 |

Control ranges for other target vacuum levels within the ranges disclosed herein can be readily determined from the disclosure of the present invention. The reactor and ejector pressures are monitored and maintained within the control ranges via digital electronic control systems. Such systems are well known in the commercial scale chemical processing art.

Basic ejector design is known in the art and is described in Roper, D. L. and Ryans, J. L., *Process Vacuum System Design and Operation*, McGraw-Hill Book Company, New York, 1986. However, the break pressure ranges necessary can not be achieved using ejectors with "standard" break pressures commonly supplied by equipment manufacturers. Accordingly, "custom" ejectors must be specified. Moreover, the pressures required to produce a variety of polymers are known. Accordingly, one skilled in the art could design vacuum systems for a number of different processes given the teaching of the present invention.

Preferably the temperature is raised and the pressure is reduced in small steps throughout the various reaction steps. As the reaction proceeds to produce longer chains of polymer, the reaction mix becomes enriched with components that are not very volatile. As this material flashes into the next reaction step at a lower pressure, the resulting vapor contains little material that can form solids in the vapor-handling equipment. Thus, solids-forming materials are kept below their solubility limits in the condensed streams, and do not precipitate out. Fouling and plugging of reactor surfaces, condensers and vacuum systems are greatly diminished in this manner.

Adding additional reaction steps to the processes of the prior art was highly undesirable. The cost of the reactor, its condenser and vacuum system deterred designers from considering an extra pressure let-down as a viable approach to control solids in all vapor-handling systems. Instead, researchers focused on ways to handle solids in the off-gas systems. Conversely, the present invention lowers the cost of both the reactor and the vapor equipment.

Overall reliability of the polymer lines is significantly improved in two ways with this invention. First, the additional vacuum level results in less solids-forming material leaving with the vapors from the polymerization process. This alone would significantly reduce fouling, and the loss of production capability that eventually occurs. Second, there are fewer components to fail in the new process and this improves overall reliability of the plant. Note that with polymer processes, the entire process goes down with the failure of any single component in the vacuum systems. The improvement in reliability becomes evident by comparing the number of equipment components in the conventional process (FIG. 1) with those in the process of the present invention (FIG. 2).

Figure 1:
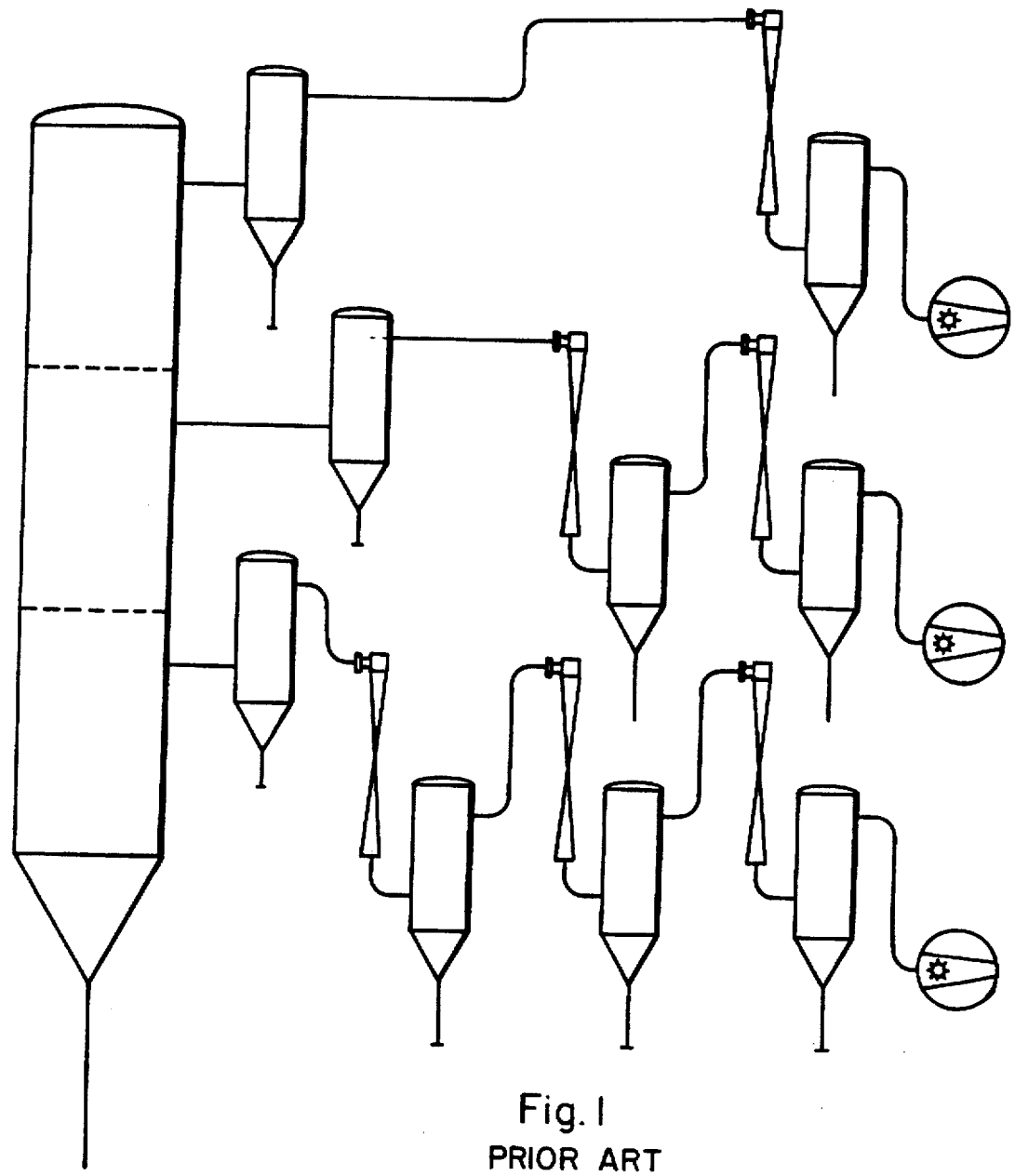
FIG. 1 shows a schematic of conventional apparatus used for the polymer production.

It is clear from comparing FIGS. 1 (prior art) and 2 (present invention) that the integrated vacuum system of the present invention is radically different. The prior art vacuum system required 9 condensers and six ejectors to maintain the appropriate vacuum levels in three chambers. The single train system of the present invention utilizes only four condensers (one of which is optional precondenser (23)) and three ejectors to provide the same vacuum levels to three chambers. Moreover, if alternate pumps are used for compression to atmospheric pressure, condenser (12) may also be optional.

We claim:

1. A polymerization system having at least two reaction chambers including a first and a final reaction chamber, wherein vacuum is used to remove vapors therefrom, the improvement which comprises a single vacuum system for supplying vacuum in increasing amounts to successive reaction chambers, said single vacuum system comprising:

a first condenser connected said first reaction chamber, a first ejector connected to said first condenser, a final ejector connected to said final reaction chamber;

an ejector discharge conduit connecting said final ejector to the condenser of the preceding chamber;

a finishing condenser connected to the first ejector by an ejector conduit;

a vacuum pump connected to said finishing condenser via a pump line; and motive fluid feedlines which are connected to each of said ejectors and which feed motive fluid into said ejectors.

2. The polymerization system of claim 1 wherein said reaction chambers are housed in a single reaction vessel having a vertical design.

3. The polymerization system of claim 1 wherein said reaction chambers are housed in a single reaction vessel having a horizontal or sloped design.

4. The polymerization system of claim 1 wherein a final chamber condenser is disposed between said final reaction chamber and a final reaction chamber ejector.

5. The polymerization system of claim 1 further comprising a second intermediate reaction chamber;
- a second condenser connected to said second intermediate reaction chamber;
- a second ejector connected to said second condenser; and
- a second ejector discharge conduit connecting said second ejector to said first condenser.

6. The polymerization system of claim 5 further comprising a third intermediate reaction chamber;
- a third condenser connected to said third intermediate reaction chamber;
- a third ejector connected to said third condenser; and
- a third ejector discharge conduit connecting said third ejector to said second condenser.

7. The polymerization system of claim 5 wherein reactions in said chambers are conducted at the following pressure ranges:
- first reaction chamber between about 8 and about 150 Torr, second reaction chamber between about 1 and about 18 Torr and third reaction chamber between about 0.2 and about 2.25 Torr.

8. The polymerization system of claim 5 wherein said first chamber ejector has an operating range between about 30 and about 750 Torr; second chamber ejector has an operating range between about 8 and about 150 Torr; third chamber ejector has an operating range between about 1 and about 18 Torr and fourth ejector chamber has an operating range between about 0.2 and about 2.25 Torr.

* * * * *